United States Patent [19]
Chisnell et al.

[11] Patent Number: 5,966,810
[45] Date of Patent: Oct. 19, 1999

[54] PACKAGING OF REPLACEABLE DESICCANT IN AN ACCUMULATOR OR RECEIVER DRYER

[75] Inventors: Jerry H. Chisnell, Northville, Mich.; John D. Fisk, Edon, Ohio

[73] Assignee: Automotive Fluid Systems, Inc., Troy, Mich.

[21] Appl. No.: 09/014,641

[22] Filed: Jan. 28, 1998

[51] Int. Cl.$^6$ .................................................. B23P 15/00
[52] U.S. Cl. ........................ 29/890.06; 62/474; 210/282; 210/DIG. 6; 96/152
[58] Field of Search .............................. 62/474, 475, 503; 96/152, 108, 147, 135, 139; 210/282, DIG. 6; 29/890.06, 890.03; 55/519

[56] References Cited

U.S. PATENT DOCUMENTS

| | | |
|---|---|---|
| 2,504,184 | 4/1950 | Dawson . |
| 2,659,128 | 11/1953 | Baldwin, Jr. et al. . |
| 3,824,802 | 7/1974 | Scherer et al. . |
| 4,111,005 | 9/1978 | Livesay . |
| 4,276,756 | 7/1981 | Livesay . |
| 4,291,548 | 9/1981 | Livesay . |
| 4,331,001 | 5/1982 | Jones . |
| 4,354,362 | 10/1982 | Schumacher et al. . |
| 4,401,447 | 8/1983 | Huber . |
| 4,405,347 | 9/1983 | Cullen et al. . |
| 4,474,035 | 10/1984 | Amin et al. . |
| 4,581,903 | 4/1986 | Kerry . |
| 4,838,040 | 6/1989 | Freeman . |
| 5,036,972 | 8/1991 | Cullen et al. ................................ 62/510 |
| 5,184,479 | 2/1993 | Koberstein et al. ................ 210/DIG. 6 |
| 5,245,842 | 9/1993 | Searfoss et al. . |
| 5,365,751 | 11/1994 | Mikesell et al. . |
| 5,419,157 | 5/1995 | Kiblawi et al. . |

Primary Examiner—John M. Sollecito
Attorney, Agent, or Firm—Vanophem Meehan & Vanophem, P.C.

[57] ABSTRACT

A pressure vessel housing that can be brazed and leak tested before adding desiccant material, eliminating the risk of damaging desiccant bags during assembly. The desiccant is added to the housing of the pressure vessel through an existing inlet opening in the top of the accumulator housing, thereby eliminating the potential for damage to the desiccant and the desiccant container while maintaining the integrity of the housing because no additional openings in the housing are required to access the desiccant material. A screen permanently mounted inside the pressure vessel supports the loose desiccant material and another screen removably attached to the inlet opening provides access to the loose desiccant material housed within the pressure vessel. A method of making the pressure vessel allows the accumulator assembly to be leak tested before the desiccant is added, reducing scrap and allowing repair of accumulator assemblies.

8 Claims, 3 Drawing Sheets

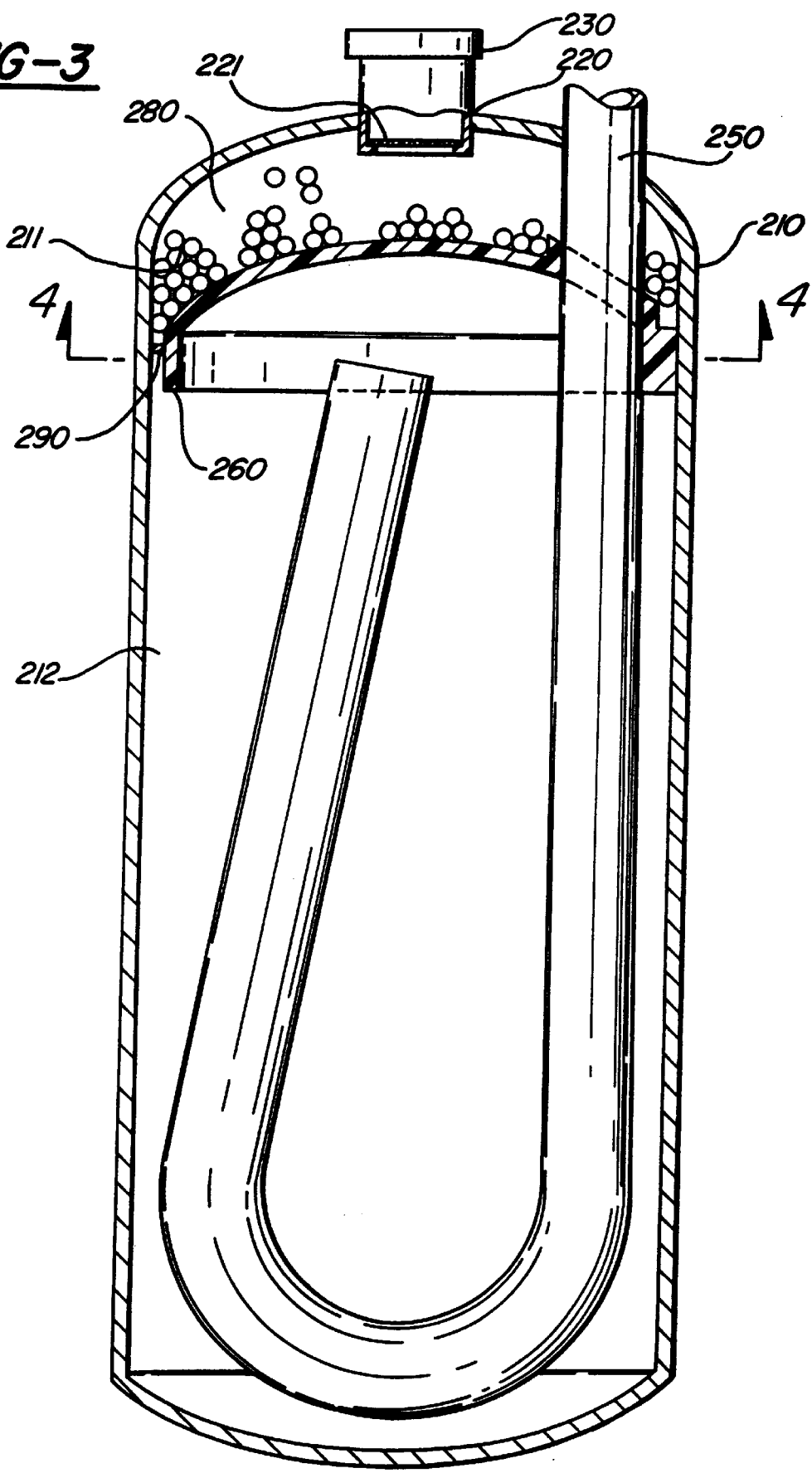

PACKAGING OF REPLACEABLE DESICCANT IN AN ACCUMULATOR OR RECEIVER DRYER

BACKGROUND OF THE INVENTION

1. Field of the Invention

This invention relates to an accumulator or receiver dryer and a method of making the same, for use in an automobile air conditioning system. More particularly, the present invention relates to packaging replaceable desiccant in an accumulator or receiver dryer.

2. Description of the Prior Art

In air conditioning systems, and particularly those for automotive applications, the accumulator is typically located at the outlet end of the evaporator. Its purpose is to filter out any particulates in the refrigerant fluid and remove any moisture present in the refrigerant vapor. A desiccant material is placed within the accumulator housing specifically for the purpose of removing the unwanted moisture from the refrigerant vapor.

During assembly of the accumulator, it is important to avoid saturating the desiccant material. Handling the desiccant material during the assembly process introduces the potential for saturation from exposure to humidity of air in the assembly area. Therefore, handling should be kept to a minimum.

A fully sealed unitary housing is a desirable feature of an accumulator. A one-piece construction without joints that may leak is an objective of accumulator assemblies. The simplicity of a unitary housing is also an important feature, which reduces costs and improves reliability. Such a unitary housing can be accomplished by spin welding closed the accumulator housing as taught by U.S. Pat. No. 4,675,971 to Masserang.

In known accumulator assemblies and methods of making same, the desiccant material is added to the housing prior to welding and leak testing the accumulator assembly. This known method introduces the risk of saturating the desiccant, and results in a high scrap rate and material cost for damage the desiccant bag incurs during brazing and testing operations.

In addition, with known devices and methods of making these devices, field repair and rework are not practical. Repairs consist of removing the defective device and replacing the entire accumulator or receiver unit.

There are accumulators for air-conditioning systems which sealingly connect a separate desiccant container in the bottom of the accumulator housing prior to permanently assembling the accumulator. The desiccant remains serviceable through the bottom of the housing. This system is disclosed in U.S. Pat. Nos. 4,276,756 and 4,291,548 to Livesay.

The Livesay references disclose an access opening in the bottom of the housing that opens into the interior of a desiccant container. A separate, empty desiccant container is placed inside the accumulator housing. A U-shaped tube is placed inside the housing. The empty desiccant container is received in the bight portion of the U-shaped tube.

The desiccant container has an open lower end that communicates with the opening in the bottom of the housing. An annular seal attachment sealingly attaches the lower end of the desiccant container through the open lower end thereof. A detachable closure cooperates with the closure fitting to close the access opening in the housing. The desiccant container is filled after the housing has been permanently assembled by inverting the container and gravity feeding desiccant material. U.S. Pat. No. 4,291,548 discloses a desiccant container that is a foldable bag that can be inserted through the opening in the bottom of the housing.

U.S. Pat. No. 4,838,040 to Freeman discloses a receiver dryer in which the housing has a readily openable lid held in place by quick disconnect clamps. The lid can be removed to allow a desiccant canister to be inserted inside the housing. To ensure adequate sealing, the housing has an annular O-ring. The separate lid has an overhang that seals against the O-ring of the housing. Additionally, the lid has an internally depending sleeve segment that is provided with another O-ring. The two O-rings are necessary to completely seal the housing against leakage. The lid is secured in place by a quick disconnect clamping band.

Accumulators must maintain high standards during testing. Therefore, a one-piece or unitary design is desired for the housing. The number of access openings and weld joints should be kept to a minimum for the housing to withstand the demanding impact, leak and burst test requirements. A drawback associated with prior art arrangements that provide access to the desiccant material is the need for a separate access opening. Additional openings disrupt the integrity of the accumulator or receiver dryer housing. Any opening in the housing introduces the potential for leaks, so a minimum number of openings is desirable.

A leak proof housing can be manufactured by spin welding a unitary housing into a closed configuration. Therefore, the number of components and attachments inside the accumulator housing should be kept to a minimum to reduce the risk of components breaking loose during the spin weld process. The accumulator disclosed in Livesay and the receiver dryer disclosed in Freeman require several additional components to accomplish accessibility to the desiccant material making spin welding impractical. In addition, if the devices disclosed by Livesay or Freeman cannot be closed by spin welding without defeating their innovative design feature of a separate opening to provide access to the desiccant.

In Livesay, not only is an additional opening required, but a separate desiccant container to hold the desiccant material is necessary. A sealing attachment between the container and the housing is necessary to maintain the desiccant container's position within the housing, and a closure member is necessary to prevent desiccant material from escaping the container.

The receiver dryer disclosed by Freeman also requires significant additional structure. A separate lid, two O-rings, a clamping band and a separate desiccant container are all necessary additional components for access to the desiccant material. Additionally, the sealing attachment between the desiccant container and the casing disclosed by Freeman must be extremely reliable to avoid desiccant material from escaping the desiccant container and contaminating the interior of the casing.

The location of the desiccant within the housing is an important aspect of an accumulator design. Ideally, the desiccant is located near the top of the housing. Locating the desiccant near the top of the housing ensures all vapor components of the refrigerant pass through the desiccant thereby improving the accumulator's performance.

In operation, the liquid refrigerant settles in the bottom of the accumulator housing. Positioning the desiccant in the bottom of the housing introduces the risk of saturating the desiccant material. In addition, all of the vapor inside the accumulator housing is not forced through the desiccant.

The vapor that remains near the top of the housing never reaches the desiccant material and may contain unwanted moisture as a result. The Livesay references disclose locating the desiccant in the bottom of the housing, which is not desirable for optimum accumulator performance.

What is needed is an accumulator housing that can be accessed for inserting or removing desiccant material, having a minimum of components and without separate access openings that compromise the integrity of the housing.

SUMMARY OF THE INVENTION

The present invention embodies a housing that can be brazed and leak tested before the desiccant is added, eliminating the risk of damaging desiccant bags during assembly. A loose desiccant material is added directly to the housing of the present invention through an existing inlet opening in the top of the accumulator housing. The loose desiccant material can be added after the accumulator is completely assembled and tested.

The potential for damage to the desiccant and the desiccant container are completely eliminated. The integrity of the housing is not compromised as no additional openings in the housing are required to access the desiccant material. The desiccant material is ideally located in the top portion of the housing.

The present invention employs a screen permanently mounted inside the pressure vessel that supports the loose desiccant material. Another screen, removably attached to the inlet opening, provides access to the loose desiccant material housed within the pressure vessel.

A method of making the present invention allows the accumulator assembly to be leak tested before the desiccant is added. This reduces scrap and allows repair of accumulator assemblies.

The method includes spin welding closed a cylindrical tube; attaching an inlet tube to the closed end of the cylindrical tube; assembling an outlet tube, baffle member, and baffle screen; inserting the outlet tube assembly inside the cylindrical tube; attaching the outlet tube to the closed end of the cylindrical tube; spin closing the remaining open end of the cylindrical tube; adding loose desiccant through the inlet tube; and inserting a removable screen to the inlet opening.

In one embodiment, the baffle screen is made of a thermoplastic material. The baffle screen is thermally bonded to the vessel's housing by centrifugal force and heat generated during the spin welding process.

The removable inlet screen facilitates field repair and rework of the accumulator assembly. It is not necessary to replace the entire accumulator assembly merely because the desiccant material needs to be replaced. The inlet screen can be removed, the accumulator can be emptied of old desiccant material, new material can be added through the inlet opening, and the screen replaced.

It is an object of the present invention to add loose desiccant material to the housing after assembly, brazing, and leak testing of the housing.

It is another object of the present invention to provide access to the desiccant material without jeopardizing the integrity of the housing.

It is yet another object of the present invention to provide access to the desiccant material without removing the housing from the overall air-conditioning system, enabling field repair.

It is a further object of the present invention to position the desiccant material in the top of the housing to ensure adequate drying of refrigerant vapor.

These objects, features, and advantages of the present invention will become readily apparent from the following detailed description of the preferred embodiment when taken in conjunction with the accompanying drawings.

BRIEF DESCRIPTION OF THE DRAWINGS

FIG. 3 is a side view shown in partial cross section of an accumulator of the present invention.

DETAILED DESCRIPTION OF THE PREFERRED EMBODIMENT

Figure 1:
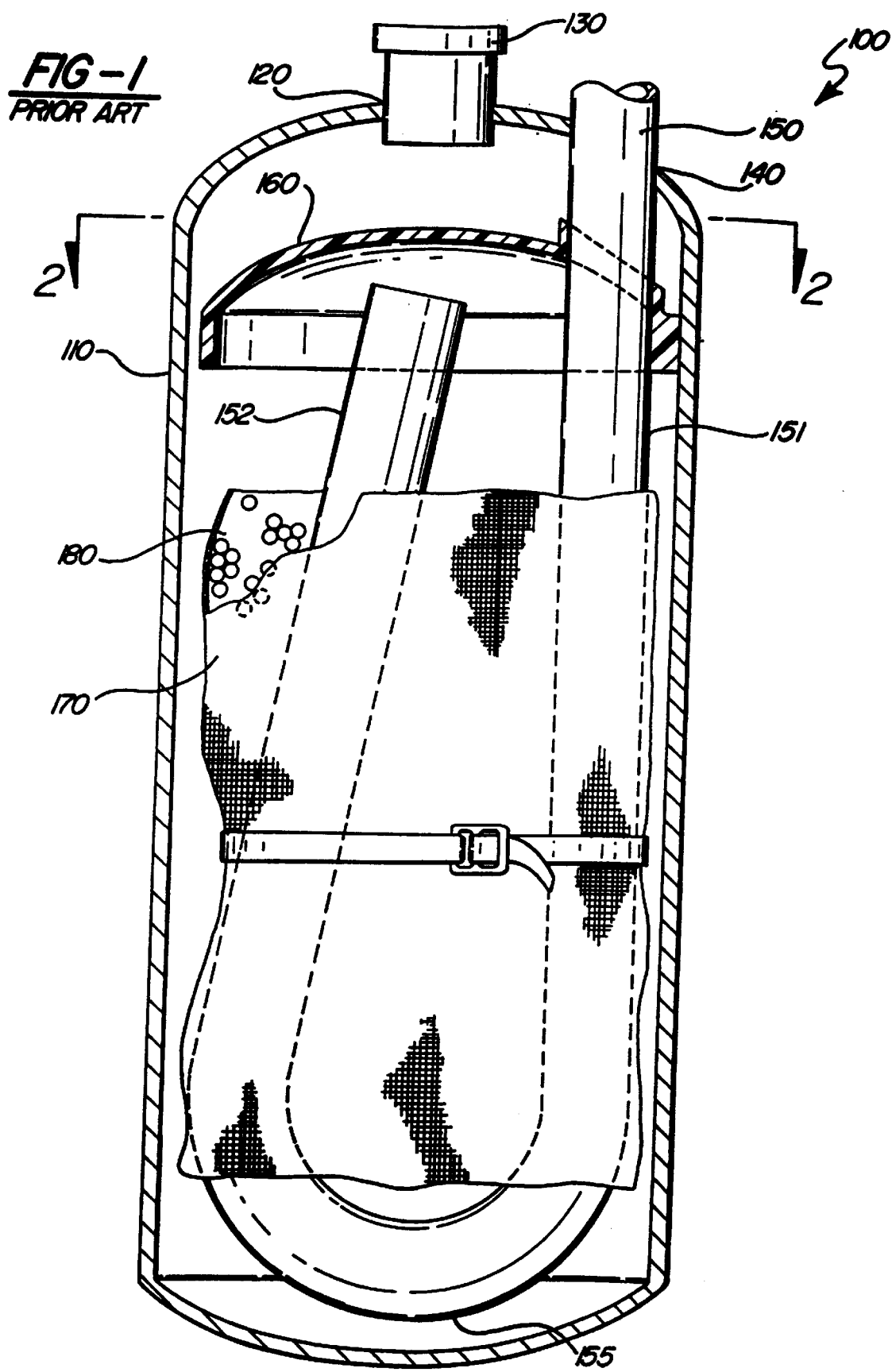
FIG. 1 is a side view shown in partial cross section of a prior art accumulator.

Referring to FIG. 1, there is a schematic of a generally conventional vehicular air-conditioning accumulator 100. The structure of the prior art accumulator 100 includes a cylindrical tubular housing 110 that is closed at both ends. Typically, the housing 110 is closed by a spin welding process being conventional in the art as taught, for example, by U.S. Pat. No. 4,675,971 to Masserang, or mig welding a center joint as known by one skilled in the art.

The prior art accumulator 100 includes an inlet opening 120 and an outlet opening 140 in the top of the accumulator housing 110 providing access to the interior of the housing 110. An inlet tube 130 is brazed or welded to the inlet opening 120 of the accumulator housing 110. An outlet tube 150 is included which receives additional structure efore it is permanently affixed to the outlet opening 140 of the accumulator housing 110.

Typically, the outlet tube 150 has a U-shaped configuration. A bight portion 155 of the outlet tube 150 is located in the lower region of the accumulator housing 110. A first leg 151 of the outlet tube 150 supports a baffle 160, or deflector plate, which is permanently fixed to the outlet tube 150 by brazing or welding. A second leg 152 of the outlet tube 150 is shorter than its first leg 151, and its end located underneath the baffle 160. The outlet tube assembly is welded or brazed to the accumulator housing 110 at the outlet opening 140 in the top of the accumulator housing 110.

A desiccant bag 170, or other container holding a desiccant material 180, is attached to the outlet tube 150 prior to the outlet tube 150 being permanently attached to the top of the accumulator housing 110. Usually the desiccant bag 170 is supported in the bight portion 155 of the outlet tube 150.

The baffle 160 is permanently affixed to the interior walls of the accumulator housing 110. Usually, this is done by tack welding the baffle 160 to the interior of the housing 110 at several locations around the perimeter of the baffle 160, or by an interference fit between tabs 161 on the outer periphery of the baffle 160 and the interior walls of the accumulator housing 110.

It is critical for proper operation of the accumulator that the desiccant bag 170 or container is not damaged while permanently attaching the baffle 160 to the housing 110, yet it is a common occurrence which cannot be detected until after the impact and burst tests are completed. If a damaged desiccant bag is discovered, the entire accumulator 100 is scrapped, which is costly.

The outlet tube 150 is permanently attached to the accumulator housing 110. Typically it is brazed or welded. The brazing process used to attach the baffle 160 and outlet tube 150 introduces significant risks to the desiccant material 180. The desiccant 180 can be damaged by the heat generated by the welding or brazing process.

The remaining open end of the accumulator 100 is closed. After the accumulator 100 is fully assembled, the unit is tested. Any failures at this stage usually result in irreparable damage to the desiccant bag 170 and the entire unit 100 must be scrapped because there is no way to access the interior of the accumulator housing 110.

Repair and rework are not options using this method of manufacture. The structure of prior art accumulators 100 is not consistent with accessing the desiccant material 180 without destroying the integrity of the accumulator housing 110.

Figure 2:
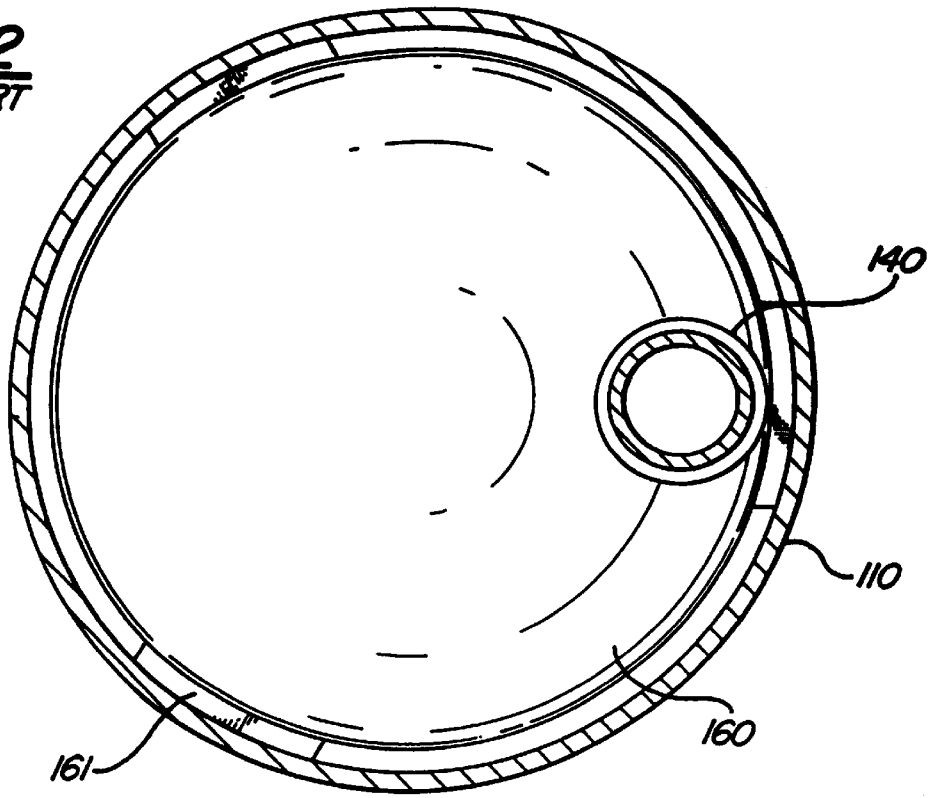
FIG. 2 is a cross-sectional view taken along line II—II of FIG. 1.
Figure 4:
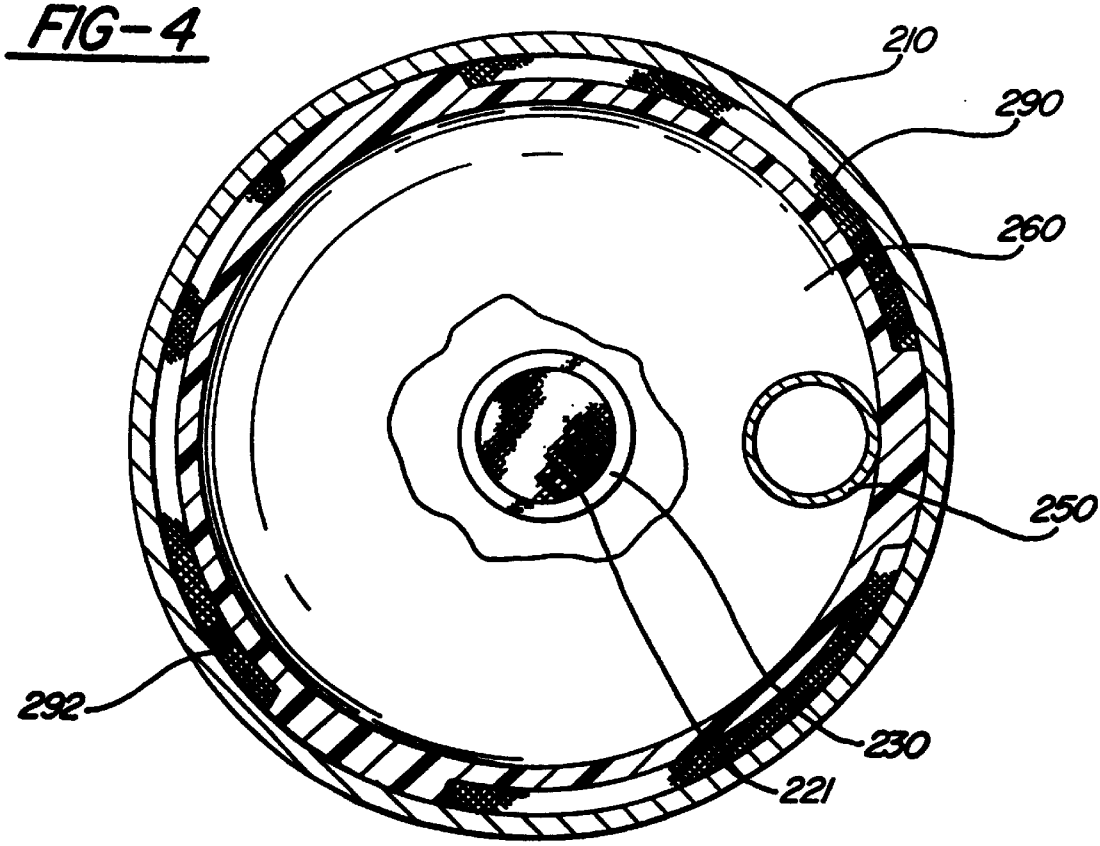
FIG. 4 is a cross-sectional view taken along line IV—IV of FIG. 3 showing the detail of the baffle screen and inlet screen of the present invention.

FIG. 3 is an accumulator 200 of the present invention that is similar to prior art accumulators except for the elimination of a separate desiccant bag 170 or container and the relocation of the desiccant material within the accumulator. Like components of the prior art accumulator of FIGS. 1 and 2 are labeled with the same reference numerals increased to 200. The present invention allows a method of manufacture that eliminates the need for a separate desiccant bag 170, thereby eliminating the risk of damage thereto and costly scrap of to the complete accumulator assembly. Additionally, the accumulator 200 of the present invention allows access to the desiccant material 280 without affecting the integrity of the accumulator housing 210.

The majority of components of the accumulator 200 of the present invention are the same as those of prior art accumulators 100. The housing 210 is spun weld closed as in prior art accumulators 100. The inlet tube 230 configuration is the same as prior art accumulators 100. The shape and positioning of the outlet tube 250 is also the same as prior art accumulators. The baffle 260 shape and position of the baffle 260 are also the same as in prior art accumulators 100.

The accumulator 200 of the present invention is modified from prior art accumulators 100 by including a screen 290 positioned between the periphery of the baffle 260 and the interior wall of the housing 210. While the shape, position and attachment of the baffle 260 to the outlet tube 250 is the same as prior art accumulators, the present invention includes the baffle screen 290 that surrounds the periphery of the baffle or deflector plate 260. The baffle screen 290 effectively separates the interior of the housing 210 into an upper chamber 211 and a lower chamber 212. The baffle screen 290 supports loose desiccant material, and therefore must have pores 292 which are small enough to prevent any desiccant material 280 from escaping into the lower chamber 212 of the housing 210. The pores 292 are large enough so as not to interfere with the flow of refrigerant fluid into the lower chamber 212 of the housing 210.

The baffle screen 290 can be attached to the outer periphery of the baffle 260 by any means sufficient to permanently affix the baffle screen 290 to the baffle 260. Some of the methods will be discussed in detail below. It is imperative that loose desiccant material 280 not escape into the lower chamber 212 of the housing 210.

The baffle screen 290 must be attached to the inner wall of the housing 210. The same method used to attach the baffle screen 290 to the baffle 260 could be employed to attach the baffle screen 2902 to the interior wall of the housing 210. The periphery of the baffle screen 290 must be completely sealed against the interior wall of the housing 210, as it is sealed to the periphery of the baffle 260, to prevent any loose desiccant material 280 from escaping.

In one embodiment of the present invention, the baffle screen 290 is initially temporarily fastened to the interior of the housing 210 by an interference fit, or tack welding. The baffle screen 290 is permanently bonded to the interior of the housing by heat generated during the welding process used to close the housing 210. The baffle screen 290 can be made of a thermoplastic or a material containing sintered thermoplastic pellets. Under centrifugal force and heat generated during the welding process, the thermoplastic material of the baffle screen 290 bonds to the interior of the housing 210.

The baffle screen 290 and baffle 260 combination divide the interior of the housing 210 into the upper and lower chambers 211 and 212. The baffle screen 290 effectively supports the loose desiccant material 280 and prevents it from escaping into the lower chamber 212 of the housing 210. The baffle screen 290 neither prohibits nor interferes with the flow of refrigerant from the upper chamber 211 into the lower chamber 212 of the housing 210.

The inlet tube 230 is permanently affixed to the inlet opening 220 in the top of the accumulator housing 210 just as in prior art accumulators 100. However, the present invention includes an inlet screen 221 that covers the inner diameter of the inlet opening 220. The purpose of the inlet screen 221 is the same as that of the baffle screen 290 surrounding the baffle 260. The inlet screen 221 does not prohibit free flow of refrigerant, yet the loose desiccant material 280 is prevented from escaping the interior of the accumulator housing.

The inlet screen 221 covering the inner diameter of the inlet opening 220 need not be permanently affixed, and it is in fact desirable to maintain the removability of this screen 221 by mounting the inlet screen 221 against a shoulder on the inlet tube or in any convenient manner providing the inlet screen 221 is removable after installing same in the inlet tube 230. The inlet screen 221 can be removed for emptying and refilling the upper chamber 211 of the housing, facilitating field repair and rework.

Finally, as mentioned above, loose desiccant material 280 is located in the upper chamber 212 of the accumulator housing 210. The loose desiccant material 280 is prevented from entering the lower chamber 212 of the accumulator housing 210 by the baffle 260 and the baffle screen 290. Likewise, the inlet screen 221 prevents the loose desiccant material 280 from escaping through the inlet opening 220. The accumulator 200 of the present invention includes introducing loose desiccant material 280 through the inlet opening 220 of the accumulator 200. Once the desiccant material 280 is added, the inlet screen 221 is placed over the inner diameter of the inlet opening 220.

One advantage of the present invention is readily apparent. The desiccant material 280 need not be added to the assembly until after the accumulator 200 is completely assembled and pressure and leak tested. This eliminates unnecessary handling of the desiccant material 280, and eliminates potential harm to the desiccant material 280 during the assembly and testing process. Additionally, the entire accumulator assembly 200, minus the desiccant material 280, can be leak, impulse and proof tested, repaired, reworked, and retested before any desiccant material 280 is added. The ability to repair and rework units saves scrapping a fully assembled unit lowering manufacturing costs.

Another advantage is that the desiccant material 280 can be accessed in the field. It is now possible to perform field repairs and maintenance procedures that were not possible before. It is no longer necessary to replace accumulators 200 that could not be repaired simply because of inaccessibility to the desiccant material 280.

The following steps are included in the method of making an accumulator 200 of the present invention;

closing one end of the housing, such as by welding as taught in U.S. Pat. No. 4,675,971, or another welding process known by one of ordinary skill in the art;

drilling inlet and outlet openings in the closed end of the housing to the same size as the outer diameter of the inlet and outlet tubes;

inserting the inlet tube into the inlet opening and brazing the tube to the top end wall of the housing;

axially inserting the baffle over a leg of the outlet tube and fastening the baffle thereto;

temporarily fastening the baffle screen around the outer periphery of the baffle by a mechanical fastener;

inserting the outlet tube, baffle, and baffle screen through the open end of the accumulator housing;

brazing the outlet tube to the housing;

fastening, by brazing or otherwise, the baffle to the interior wall of the housing;

temporarily fastening the baffle screen to the interior wall of the housing by means of mechanical fasteners;

closing the remaining open end of the accumulator housing, by spin welding to generate enough heat to thermally and centrifugally bond the baffle screen to both the baffle and the interior wall of the housing;

introducing loose desiccant material through the inlet tube into the upper chamber of the outlet housing; and removably fastening an inlet screen within the inner diameter of the inlet tube over the inlet opening of the accumulator housing.

While the preferred embodiment of the present invention is to thermally bond the baffle screen to the interior of the housing, any alternative method of attachment may also be employed to obtain the same results, such as welding or adhesive bonding.

Although a particular embodiment of the present invention has been illustrated in the accompanying drawings and described in the foregoing detailed description, it is to be understood that the present invention is not to be limited to just the embodiments disclosed. For example, the baffle screen could be adhesively bonded to the baffle and interior wall of the accumulator housing and the remaining end of the housing closed by means other than spin welding. Another example involves relying on the permanent bond between the interior wall of the housing, the baffle screen and the baffle to maintain the baffle's position within the accumulator housing and eliminating the step of fastening the baffle to the outlet tube. Numerous rearrangements, modifications and substitutions are possible, without departing from the scope of the claims hereafter.

What is claimed is:

1. A pressure vessel comprising:

a fully enclosed elongate housing having an inlet opening, an outlet opening and an interior surface defining an enclosed chamber;

an inlet tube extending through said inlet opening of said housing and having a discharge end within said housing;

an outlet tube extending through said outlet opening of said housing and having an inlet end spaced below said inlet tube discharge end;

a baffle member having an outer periphery, said outlet tube extending through and secured to said baffle member, said baffle member positioned within said housing and below said discharge end of said inlet tube and above said inlet end of said outlet tube;

a baffle screen having first and second peripheries, said first periphery of said baffle screen circumscribing and fixed to said outer periphery of said baffle member, said second periphery of said baffle screen circumscribing and fixed to said interior surface of said housing, whereby said baffle member and said baffle screen divide said enclosed chamber into an upper chamber and a lower chamber;

means for fastening said baffle screen to said interior chamber of said housing;

an inlet screen secured to said inlet opening; and a loose desiccant material disposed within said upper chamber of said housing, said baffle screen for supporting said loose desiccant material in said upper chamber and preventing said loose desiccant material from entering said lower chamber, said inlet screen for preventing said loose desiccant material from entering said inlet tube.

2. The pressure vessel as claimed in claim 1 wherein said housing is an elongate cylindrical tube closed at each end by centrifugal spinning.

3. The pressure vessel as claimed in claim 2 wherein said housing is an aluminum alloy.

4. The pressure vessel as claimed in claim 1 wherein said baffle screen is a thermoplastic.

5. The pressure vessel as claimed in claim 4 wherein said means for fastening said baffle screen to said interior chamber of said housing further comprises means for thermally conforming said baffle screen to said interior chamber of said housing under action of centrifugal force and conductive heat generated during spin closing of said housing.

6. A method of making a pressure vessel comprising the steps of:

closing one end of an open ended cylindrical tube leaving an open end;

drilling inlet and outlet openings into said closed end;

inserting and brazing an inlet tube to said inlet opening;

attaching a baffle member to an outlet tube;

fastening a baffle screen around an outer periphery of said baffle member;

inserting said outlet tube, baffle member and baffle screen through said open end of said cylindrical tube into said outlet opening;

brazing said outlet tube to said outlet opening;

fastening said baffle screen to the interior wall of said cylindrical tube;

closing said remaining open end of said cylindrical tube by centrifugal spinning creating an enclosed chamber divided into upper and lower chambers by said baffle member and baffle screen;

inserting loose desiccant material through said inlet tube into said upper chamber of said housing; and attaching a removable inlet screen to said inlet opening.

7. A method of making a pressure vessel as claimed in claim 6 wherein said step of fastening a baffle screen around said baffle member further comprises fastening a baffle screen made of thermoplastic.

8. A method of making a pressure vessel as claimed in claim 7 wherein said step of fastening said baffle screen to said cylindrical tube further comprises fastening said baffle screen to said cylindrical tube by fusing said baffle screen to said cylindrical tube by centrifugal force and conductive heat generated from spin closing said remaining open end of said cylindrical tube.

* * * * *

UNITED STATES PATENT AND TRADEMARK OFFICE
CERTIFICATE OF CORRECTION

PATENT NO. : 5,966,810
DATED : October 19, 1999
INVENTOR(S) : Chisnell et al.

It is certified that error appears in the above-identified patent and that said Letters Patent is hereby corrected as shown below:

Column 2,
Line 37, delete "if".

Column 4,
Line 10, delete "II-II" and insert -- 2-2 --.
Line 14, delete "IV-IV" and insert -- 4-4 --.
Line 33, delete "efore" and insert -- before --.
Line 42, after "and its end" insert -- is --.

Column 5,
Line 3, after "desiccant", insert -- material --.
Line 24, delete "to".
Line 35, before "shape" delete -- baffle 260 --.
Line 63, delete "2902" and insert -- 290 --.

Column 6,
Line 39, delete "212" and insert -- 211 --.

Column 7,
Line 2, delete the semi-colon ";" and insert a colon -- : --.

UNITED STATES PATENT AND TRADEMARK OFFICE
CERTIFICATE OF CORRECTION

PATENT NO. : 5,966,810
DATED : October 19, 1999
INVENTOR(S) : Chisnell et al.

It is certified that error appears in the above-identified patent and that said Letters Patent is hereby corrected as shown below:

<u>Column 8,</u>
Line 10, delete "chamber" and insert -- surface --.
Lines 27 and 28, delete "chamber" and insert -- surface --.
Line 29, delete "chamber" and insert -- surface --.

Signed and Sealed this

Twenty-eighth Day of August, 2001

*Attest:*

*Attesting Officer*

NICHOLAS P. GODICI
*Acting Director of the United States Patent and Trademark Office*